United States Patent [19]

Whitaker

[11] 4,101,733
[45] Jul. 18, 1978

[54] ELECTRONIC DX SIGNALING CIRCUIT
[75] Inventor: Donald Edward Whitaker, Jackson, Tenn.
[73] Assignee: International Telephone and Telegraph Corporation, New York, N.Y.
[21] Appl. No.: 794,335
[22] Filed: May 6, 1977
[51] Int. Cl.² .......................................... H04L 25/02
[52] U.S. Cl. ................................................. 178/58 R
[58] Field of Search ............... 178/58 R, 58 A, 50, 178/59, 60, 61, 70 R, 73, 71; 179/18 F, 18 FA, 81 R, 84 R, 16 A, 27 R

[56] References Cited
U.S. PATENT DOCUMENTS 3,566,031  2/1971  Carbone et al. ...................... 178/59
3,725,582  4/1973  Davis ................................. 178/58 R
3,999,013  12/1976  Reed et al. ......................... 178/58 A Primary Examiner—Thomas A. Robinson
Attorney, Agent, or Firm—James B. Raden; Marvin M. Chaban

[57] ABSTRACT

A duplex transmission circuit using electronic components in place of either the multiple winding polar relays or combinations of differential amplifiers currently being used. In the circuit, algebraic additions and subtractions of voltage are performed and the results compared within an operational amplifier to produce the known outputs for E and M signaling in telecommunications systems. An additional operational amplifier is provided to produce a delayed response to signals of longer than a predetermined duration.

3 Claims, 4 Drawing Figures

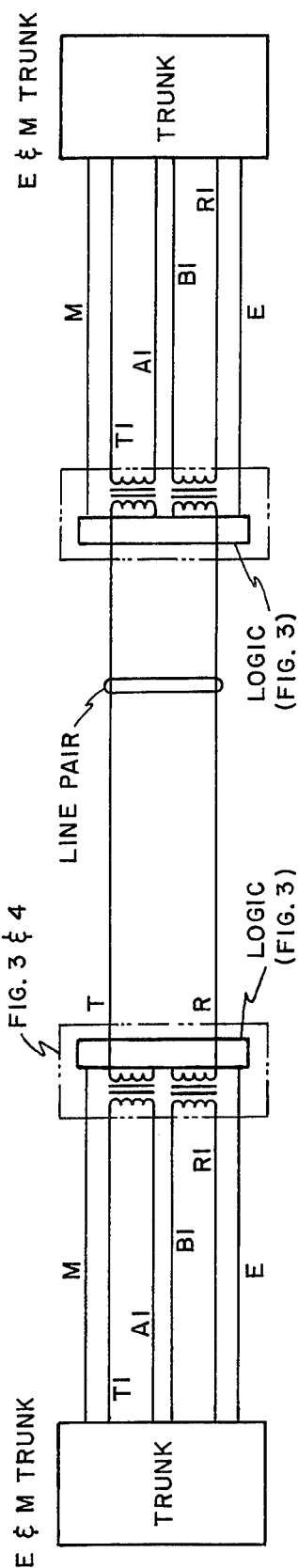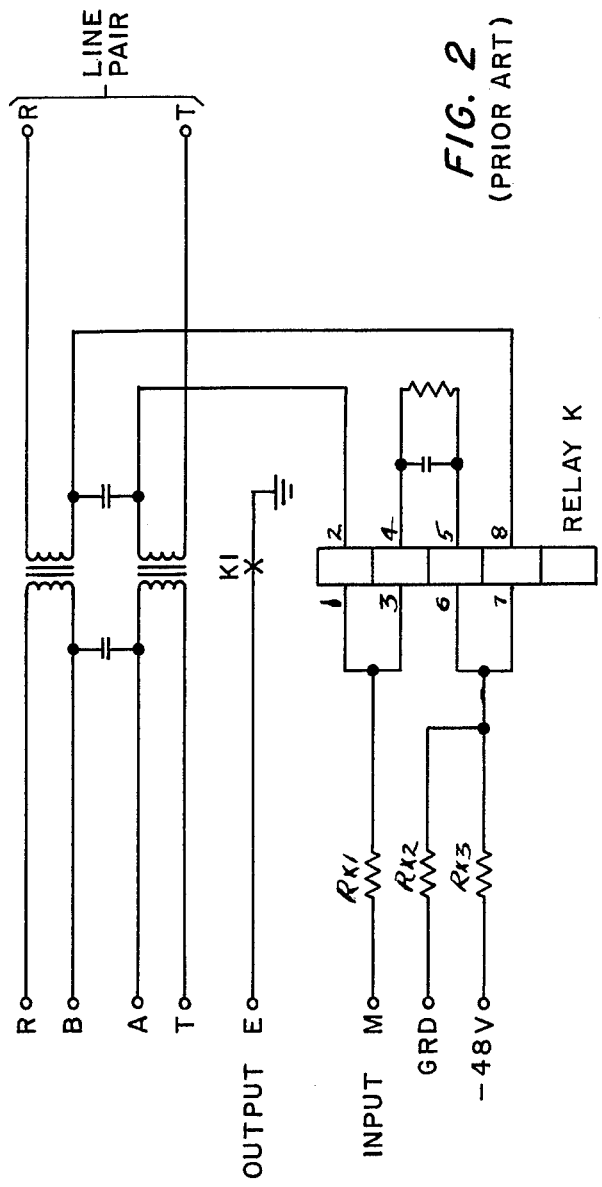

ELECTRONIC DX SIGNALING CIRCUIT

BACKGROUND OF THE INVENTION

One conventional method of supplying duplex signaling for telephone trunk networks is performed using a four-winding polar relay in the signaling circuit of the originating office and a like polar relay in the terminating office. Each relay is operated in response to current flow in the proper combination of windings, the current being of the proper direction and magnitude. The polar relay in the originating office responds to originating office conditions to provide a signal on the transmission or M lead and applies signals to the receive or E lead in the terminating office accordingly. The relay in the originating office responds to the answer condition in the terminating office to provide supervisory control.

In replacing the four-winding relay with solid state components, at least one known approach is that of using a circuit employing two differential amplifiers in place of each four-winding relay. The amplifiers sense the input conditions to sum the results in reaching an operating threshold to a further pair of amplifiers. A plurality of settable straps in combination with potentiometers allow the circuit to be adjusted for line variables.

SUMMARY OF THE INVENTION

The present invention provides a simple and inexpensive circuit for providing conventional duplex signaling for use with E and M signaling trunks in telephone systems.

In the circuit, the logic and detecting functions are essentially performed by one operational amplifier which acts to sum the voltages received from either direction to simulate the functioning of the conventional four-winding polar relays in a simple inexpensive manner.

In an analogy to the use of a four-winding relay, the windings of the relays are replaced by individual resistors. The voltage drop across the resistors is used to operate the output amplifier to produce the output which would result from the operation of the relay.

Using amplifiers, the voltages (in an originating office) received from the trunk circuit are summed to produce outputs when the trunk circuit is seized, and pulsed. Outputs are also produced when the terminating line answers and subsequently when it releases or disconnects.

It is therefore an object of the invention to produce a simple and inexpensive duplex signaling circuit using solid state components as the condition change detectors, the same circuit being usable at both ends of a trunk pair.

It is a further object of the invention to provide a DX signaling circuit which has as its major active components two operational amplifiers which sum voltages responsive to sensed conditions to transmit signals representing these conditions bidirectionally.

It is still a further object of the invention to provide a DX signaling circuit for a telephone trunk which sums the voltages received from the transmit conductor in the seized condition with the normal voltage of the system to produce an output in the amplifier, the output being transmitted from the originating to the terminating office, and for responding to a seize condition (answer) at the terminating office.

Other objects, features and advantages of the invention will become apparent from the following specification viewed in conjunction with the drawings as briefly described.

BRIEF DESCRIPTION OF THE DRAWINGS

FIG. 1 is a block diagram showing a conventional DX signaling network into which my invention may be coupled;

FIG. 2 is a circuit diagram of a DX signaling circuit of a known type using a four winding polar relay which my circuit replaces;

DETAILED DESCRIPTION OF THE DRAWINGS

In FIG. 1, I show duplex signaling networks interposed between one office designated Originating Office (OR) and the other designated Terminating Office (TM). Between the offices, a trunk pair labeled T (Tip) and R (Ring) extend to provide signals for SEIZE, PULSE, ANSWER and RETURN TO IDLE bidirectionally.

In each office there is a trunk circuit for interfacing between the switching network (not shown) and the trunk pair of conductors directed to the other office. In FIG. 1, there is shown an OR office and a TM office. Each office has an identical DX signaling unit coupled to the trunk pair through a repeat coil, the repeat coil being coupled to a logic circuit in the DX signaling unit and through conductors T1, R1, A1, B1, M and E to the trunk circuit.

The logic circuit in the OR office responds to seizure and pulsing input from the local office over the M lead to emit signals of these conditions over the trunk pair to the TM office DX signaling unit. The logic circuit responds to an answer condition from the trunk pair to condition its trunk over the E lead and to cause the circuit to return to its idle state on a disconnect signal from the trunk pair.

In FIG. 2, I show a known logic circuit using a four-winding polar relay to perform the duplex signaling function. In the circuit of FIG. 2, relay K has a winding 1-2 connected through the repeat coil and trunk pair to the 2-1 winding of a like relay in the TM office logic unit. This path provides communication between the M leads of each office through what may be considered the dominant winding of the relay. A further path from the M lead may be traced through resistor RX1, winding 3-4 and 5-6 to complete the voltage divider resistor RX3 as indicated.

Thus, the logic circuit in an originating (OR) office (as shown in FIG. 2) transmits a signal representing battery on its M lead in response to seizure of the trunk from the originating (OR) office. This signal in the form of a current condition causes the relay at the terminating (TM) office to be energized. When the TM office answers, the voltage on the M lead at the terminating office is switched to a battery condition eliminating the potential difference between the M leads. The K relay in the originating office is energized due to its local bias and the TM office K relay remains energized.

Each K relay has one contact pair shown, the contact pair providing a ground signal over the E lead when the respective relay is closed.

It is clear that when the OR office transmits interrupted dial pulses on a seized condition the M lead path through the repeat coils is interrupted to cause the relay at the terminating end (only) to pulse responsive to the input pulses.

Figure 3:
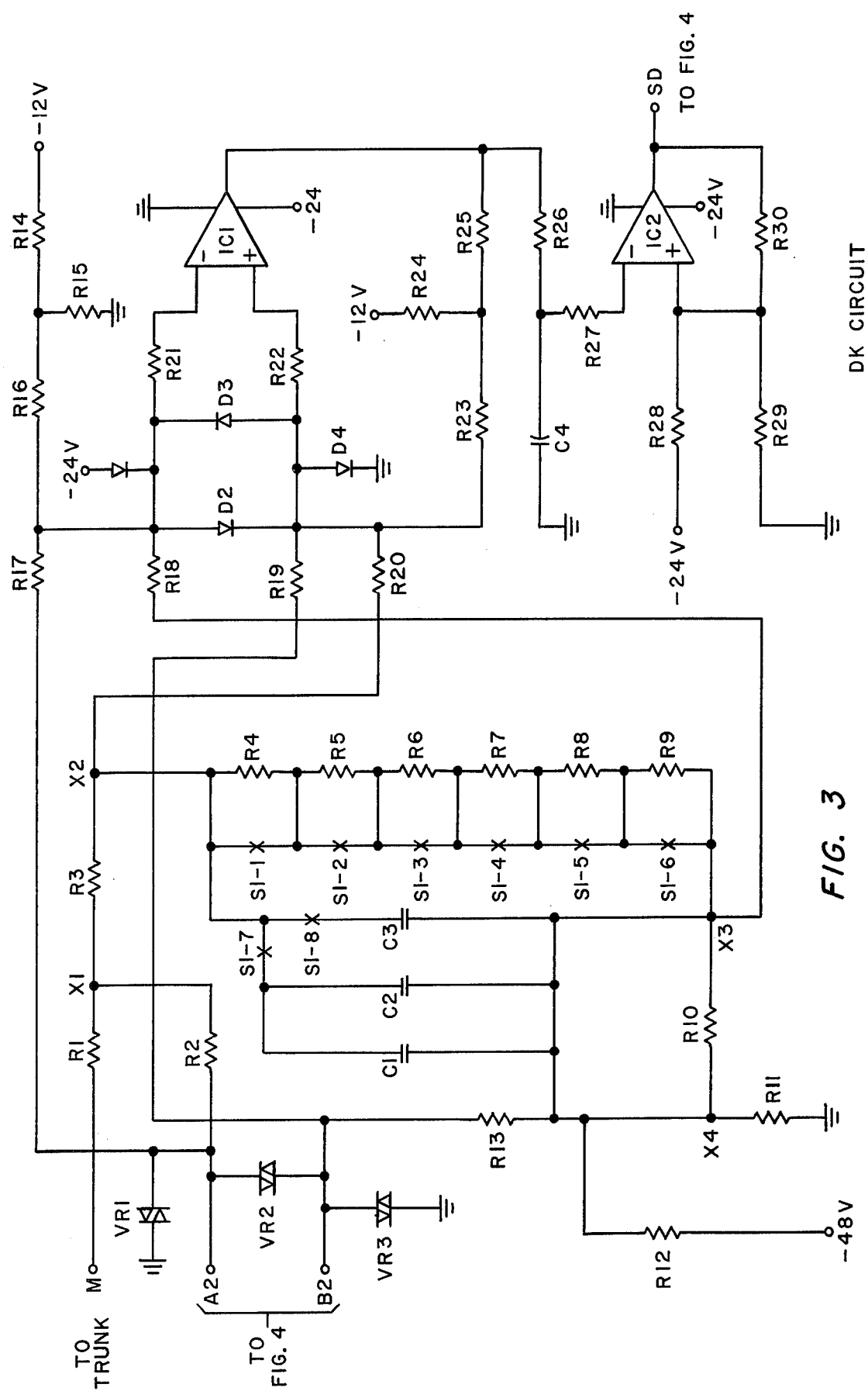
FIGS. 3 and 4 combine to form a schematic circuit diagram of the duplex signaling circuit embodying my invention.
Figure 4:
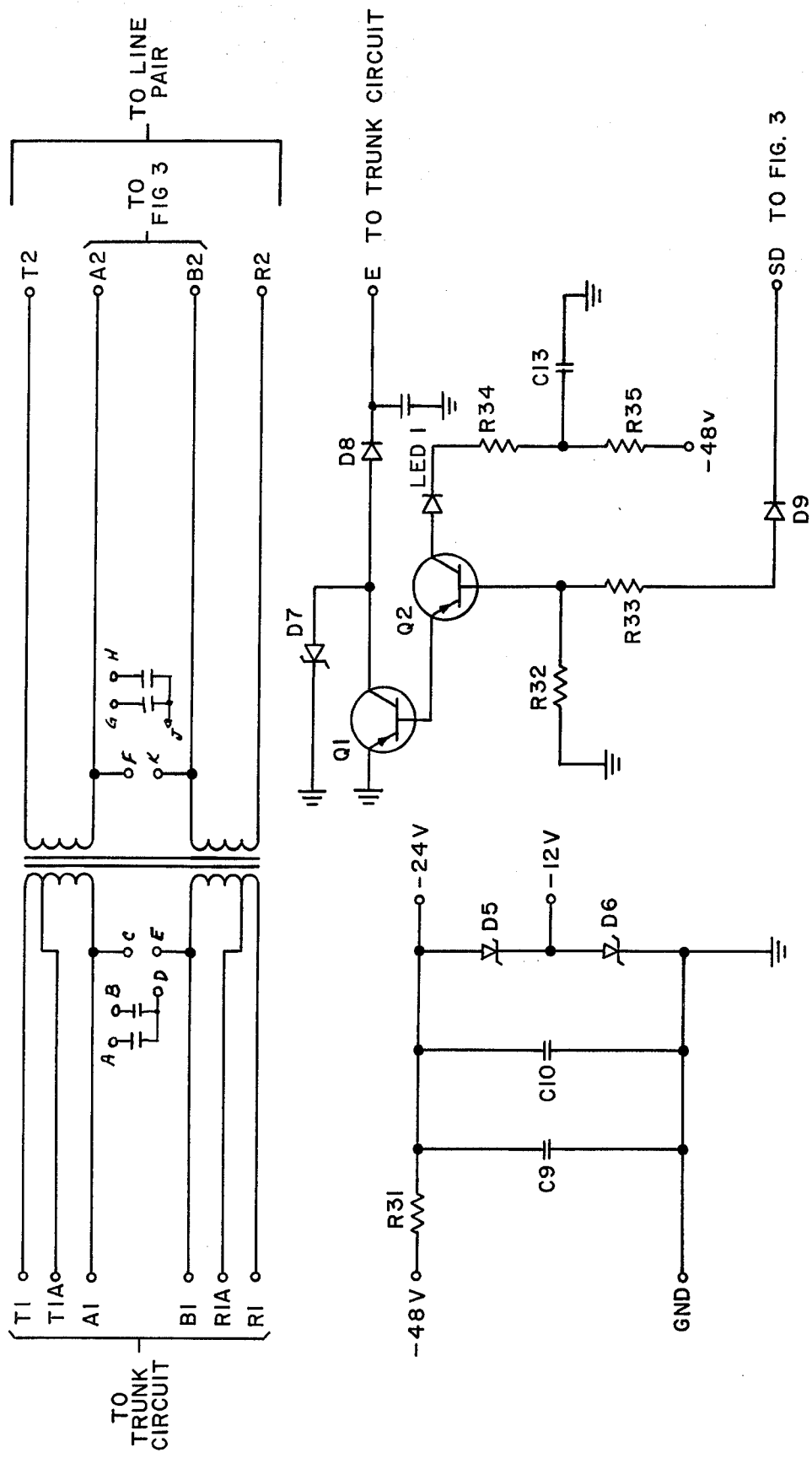

In FIGS. 3 and 4, I show a solid state logic circuit, and have included in FIG. 4 the repeat coil with its input conductors directed to the trunk circuit. On the secondary side of the coil, the outer conductors T2 and R2 are connected to the trunk pair and the inner conductors A2 and B2 provide inputs to the logic circuit of FIG. 3.

At the left in FIG. 3, there can be seen the M lead. When used in an OR office, the input condition changes from ground in the idle condition of the trunk to a battery condition when the trunk is seized. The battery condition remains on the M lead after the TM office answers and restores on a disconnect to return to idle. Also during pulsing from the originating end, the M lead will return to ground during each pulse.

In the circuit as shown, there are a plurality of switches S1-1 through S1-8 which allow the switching in or out of resistors and capacitors for line and network balance combinations through the R-C network.

The major active element of FIG. 3 is the operational amplifier IC-1 which may be a suitable amplifier such as that sold by National Semiconductors under the part number LM 307 as a separate component. Amplifier IC-2 may be combined with IC-1 as a unit using part number 1458 as a dual amplifier.

Amplifier IC-1 is used as a comparator by comparing the signals received on its respective input (−) lead with a reference set by a reference network on the plus (+) lead.

The output of amplifier IC-1 forms the input of IC-2 which is used as an integrator. The output of IC-2 is fed on lead SD to the base of transistor Q2 (FIG. 4) as the input to a triggering and inverting network through transistors Q2 and Q1, having at the output of the network the E lead to the trunk circuit. The E lead is normally in essentially an open circuit condition and is grounded on conduction of output transistor Q1.

In the circuit of FIG. 3, there are four resistors of major importance - R2, R3, R10 and R13, all of which have equal resistance which may be 400 ohms.

When the logic circuit of FIGS. 3 and 4 is used on a call as the OR office, the circuit must respond to changes on the M lead in the manner previously described.

Of course, in the idle condition, there is ground on the M lead at the OR office, this ground being transmitted to the TM office through the trunk pair. In both offices, the ground condition biases the circuit to a normal condition.

When the circuit of FIG. 3 (in the originating office) is seized by the OR office trunk circuit, negative battery appears on the M lead in place of the normal ground. The battery is fed through resistor R2 to the A lead to transmit this signal to the trunk pair and to the TM office. In the TM office, the signal passes through the repeat coil to the A lead and resistances R2 and R1 and provide an output signal on the E lead at the TM office, the signal appearing as ground.

At the TM office, voltage detection is performed in the circuit of FIG. 3, the resistance battery on lead A2 passes through resistor R2 to point X1. This voltage is summed with the voltage drop through resistor R3 to point X2 and the voltage drop across resistors 4-9 (X2-X3) and the drop across resistor R13 (X4-B). Algebraically, this summing reads as follows:

(A-X1) + (X1-X2) + (X3-X4) + (X4-B) = Threshold (TH) (Negative)

(A-X2) + (X3-B) = TH (A+X3) − (X2+B) = TH

When this summed threshold level is reached, the negative input to IC-1 causes the comparator to turn on over a path thru resistors R17, R18, R19 and R20.

Within the comparator network, resistors R14, R15, R16, R17 and R18 comprise a voltage divider network to produce a voltage level of K(A+X3) at the (−) input of comparator IC-1. A second voltage divider network is formed by resistors R19, R20, R23, R24 and R25 to produce a voltage level of K(X2+B) at the (+) input of comparator IC-1. In these networks, the following resistance relationships are present, i.e. R14 = R24, R16 = R23, R17 = R18 = R19 = R20. Of these, resistors R16-20 and R23 should be high precision resistors or matched resistances.

With the relationships as defined, the comparator IC-1 senses the magnitude and direction of current flow through the resistors R2, R3, R10 and R13 according to the equation noted. The voltage drop across each of the resistors is sensed and the combination is fed to the (+) and (−) inputs of IC-1. Comparator IC-1 switches on when the difference between the two voltage dividers fed to IC-1 reaches above the predetermined threshold.

Within the dividers, provision is made for hysteresis within the circuit, with resistors R14 and R15 determining the center of the hysteresis loop and resistors R24 and R25 determining the width of the loop to set the upper and lower threshold values of the comparator IC-1. The diodes D1-D4 and resistors R21 and R22 provide input protection for the comparator.

Comparator IC-2 acts as a symmetrical integrator to filter out pulses of short duration, such as those caused by noise. The combination of capacitor C4 and resistor R26 provide integration of the signals received from comparator IC-1. Resistors R28, R29 and R30 provide a hysteresis loop to make the integration symmetrical, i.e. that the time to switch in one direction equals the time to switch in the other direction.

With the circuit in the idle condition the output of comparators IC-1 is at −24v, IC-2 output is at 0v and output devices Q1, Q2 and LED-1 are all off. The active condition of the circuit producing an output on E lead occurs with the output of comparator IC-1 at 0v, output of IC-2 at −24v, and Q1, Q2 and LED on.

When interrupted dial pulses are transmitted, the amplifier circuits follow these pulses by turning off and on transistor Q1 through the path previously described.

When the TM office line answers the call, battery is applied to lead M at the TM office. This change of condition from ground to battery maintains the amplifier IC-1 on to keep ground on the TM office E lead.

Both M leads are at battery potentials when the called trunk has answered. The battery on the M lead is transmitted through resistors R2 and R3 at the TM office and out the A2 lead to the originating office where it is received on the A2 lead at the OR office. The battery on the M leads at both offices tend to cancel one another out. The voltage across R10 causes the amplifier IC-1 to turn on at the OR office and to result in conduction of transistor Q1. Transistor Q1 provides the output ground on the E lead.

When the party at either office disconnects, the M lead at that office has its condition changed from battery to ground creating a potential difference between the M leads at the two offices. The resulting current flow shuts off the amplifier IC-1 at the other office to turn off transistor Q1 and remove ground from the E lead. The M lead returns to a grounded condition.

When the other office disconnects, there is again no potential difference between the M leads, and the ground on the A lead causes the amplifiers IC-1 and IC-2 to shut off and to remove ground from the E lead.

The circuit has now returned to the idle condition.

In summary, the comparator senses the potential of the local M lead and the potential difference between both M leads, to switch the output on certain combinations, i.e. (1) with its own M lead at ground potential and a potential difference between the M leads and (2) with its own M lead at negative battery and no potential difference between M leads. On any other combination of conditions the comparator does not switch.

The network also sets the shape of the hysteresis loop of the comparator output and acts to produce the operating thresholds of the comparator.

The output of the comparator is integrated symmetrically filtering out noise, and providing approximately equal switching times regardless of the conditions causing the switching.

I claim:

1. A trunk signaling arrangement for a telephone system for signaling over two conductors between a first and a second office using E and M signaling techniques, a duplex trunk circuit in each office, each trunk circuit including means for transmitting the condition of its M lead over one said two conductors to the other office, a resistive balance network in each trunk circuit for sensing the condition of its M lead and the potential difference between its M lead and the M lead of the trunk circuit at the other office, an electronic comparator circuit in one trunk circuit responsive to certain predetermined combinations of conditions from said network for switching an output circuit from a quiescent to an active condition, said comparator circuit comprising an operational amplifier having two input terminals and an output terminal, and in which two substantially identical resistances of said network are coupled between the M lead of said one trunk circuit and one input terminal of said comparator circuit and in which two substantially identical resistances of said network are coupled to the other input terminal of said comparator circuit.

2. A trunk signaling arrangement as claimed in claim 1, in which there is a symmetrical integrating circuit coupled to the output terminal of said comparator circuit to integrate the output of said comparator when switched to said active condition.

3. A trunk signaling arrangement as claimed in claim 2 in which there are further resistances coupled to the input terminals to said comparator circuit for providing a hysteresis in the switching of said comparator circuit.

* * * * *